J. F. AND R. S. WALTERS.
YIELDABLE CLUTCH.
APPLICATION FILED NOV. 3, 1920.
1,403,018.
Patented Jan. 10, 1922.
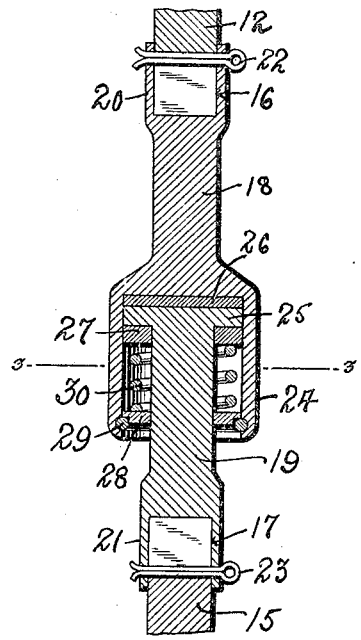
Fig. 2.
Fig. 3.
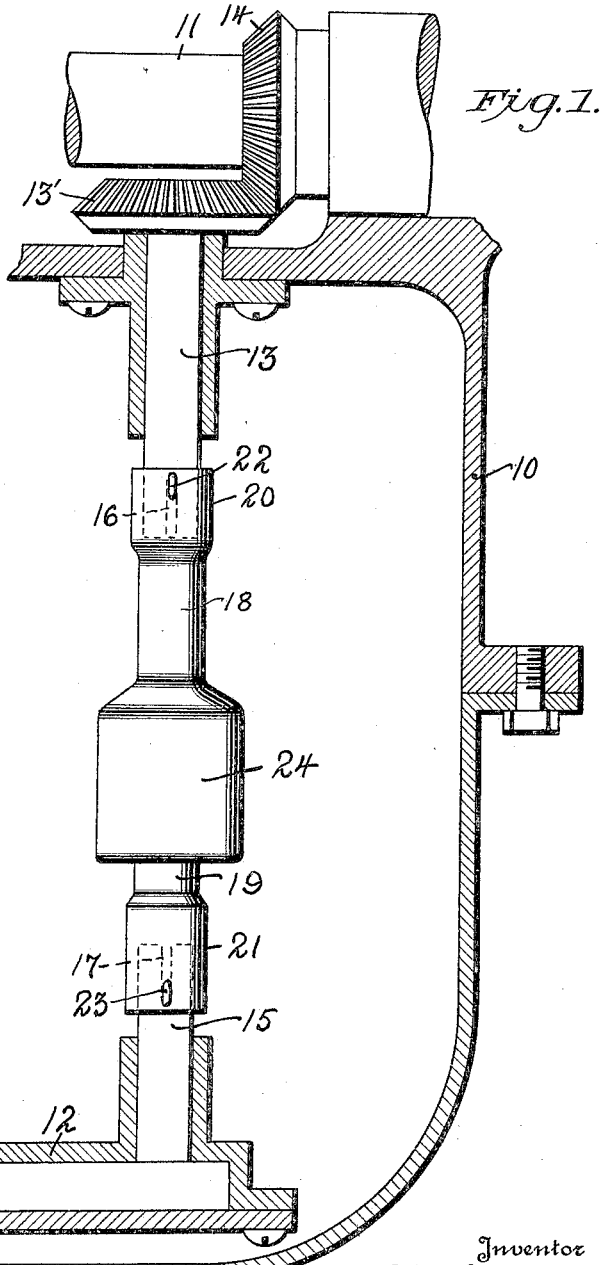
Fig. 1.
Inventor
J. F. Walters,
R. S. Walters,
By
Geo. P. Kimmel, Attorney

UNITED STATES PATENT OFFICE.

JOHN F. WALTERS AND RICHARD S. WALTERS, OF BATTLE CREEK, MICHIGAN.

YIELDABLE CLUTCH.

1,403,018.  Specification of Letters Patent.  Patented Jan. 10, 1922.

Application filed November 3, 1920. Serial No. 421,592.

*To all whom it may concern:*

Be it known that we, JOHN F. WALTERS and RICHARD S. WALTERS, citizens of the United States, residing at Battle Creek, in the county of Calhoun and State of Michigan, have invented certain new and useful Improvements in a Yieldable Clutch, of which the following is a specification.

This invention relates to clutch devices of the friction type, and has for one of its objects to provide a simply constructed device of this character whereby any abnormal checking of the motion of the driven devices will not react against the driving devices.

Another object of the invention is to provide a simply constructed device of this character whereby the heat generated by the interruption of the motion is utilized to overcome the cause of the interruption.

With these and other objects in view, the invention consists in certain novel features of construction as hereinafter shown and described and then specifically pointed out in the claim, and in the drawings illustrative of the preferred embodiment of the invention.

Figure 1 is an elevation of portions of a driving member and a driven member, with the improved clutch device between them.

Fig. 2 is a sectional elevation of the improved device.

Fig. 3 is a transverse section on the line 3—3 of Fig. 2.

The improved device is designed more particularly for use in connection with the oil pumps of internal combustion engines, to prevent damage to other parts of the machinery in event of the abnormal checking of the motion of the pump from any cause, for instance by freezing in cold weather, and in which the heat generated within the clutch device is utilized to thaw out the pump and other parts, and restore them to normal condition.

For the purpose of illustration the improved apparatus is shown applied to a conventional oil pump and its driving mechanism as employed in connection with an internal combustion engine, a part of the casing for the crank shaft being represented at 10, a portion of the cam shaft at 11, and the oil pump at 12.

Mounted in the casing 10 is an upper shaft section 13 having a bevel gear 13' at the upper end engaged with a similar bevel gear 14 on the cam shaft.

Extending from the pump 12 is another or lower shaft section 15, the shaft sections 13 and 15 having slots 16 and 17 in their confronting ends.

Disposed between the shaft sections 13 and 15 are other shaft sections 18 and 19, the member 18 having a socket 20 engaging over the slotted portion of the shaft section 13, while the shaft section 19 is formed with a similar socket 21 engaging over the slotted portion of the shaft section 15.

For the purpose of this description the shaft section 13 is referred to as the upper shaft section, the shaft section 15 as the lower shaft section, the shaft section 18 as the upper intermediate shaft section, and the shaft section 19 as the lower intermediate shaft section.

A cotter pin 22 passes through the sides of the socket 20 and also through the slot 16, while a similar cotter pin 23 passes through the walls of the socket 21. By this means the shaft sections 13 and 15 are coupled for rotation respectively to the shaft sections 18 and 19 and likewise slidable longitudinally thereon, as will be obvious.

The lower end of the upper intermediate shaft section 18 is formed into a relatively large socket or tubular enlargement 24, and the upper end of the lower intermediate shaft section 19 is formed with a laterally directed head 25 which fits relatively close within the tubular enlargement 24.

A disk washer 26 of fiber or the like is interposed between the head 25 and the inner wall of the tubular enlargement 24. While a ring washer 27 also of fiber or the like surrounds the lower intermediate shaft section 19 and bears beneath the head 25.

Bearing around the lower intermediate shaft section 19 within the enlargement 24 is an annular stop member 28, the latter held in place by a divided ring 29 engaging in an annular groove in the inner face of the enlargement.

Fitting around the lower intermediate shaft section 19 within the enlargement 24, is a spring 30, and bearing at its ends respectively against the stop member 28 and the ring washer 27 and exerting its force to frictionally couple the shaft sections 18 and 19.

The spring 30 will be of sufficient force to couple the shaft sections to operate under ordinary conditions, for instance with oil in the casing 10 at normal temperature, but which will yield in event of the oil becoming congealed under normal temperature and checking the motion of the pump, and thus prevent damage to the gears 13 and 14, or other parts.

The relatively heavy friction incident to the checking of the motion of the pump and the lower shaft section 15, generates heat in the head 25 and lower intermediate shaft section 18 and this heat will be radiated into the pump and the oil surrounding the same, and will thus thaw out the pump and restore it to normal condition.

The oil in the casing 10 and in the pump 12 will thus be automatically maintained at an operative temperature.

The improved device is simple in construction, can be readily applied to different makes of engine casings without material structural change.

The preferred embodiment of the invention is disclosed in the drawings and set forth in the specification, but it will be understood that any modifications within the scope of the claimed invention may be made in the construction without departing from the principle of the invention or sacrificing any of its advantages.

We claim:

In a device of the class described, an upper shaft section supported for rotation and having a longitudinally directed slot in its lower end, a lower shaft section mounted for rotation and having a longitudinal directed slot in its upper end, an upper intermediate shaft section having a tubular enlargement at its upper end and a socket slidable over the slotted portion of the upper shaft section, a holding pin extending through the socket of the upper intermediate shaft section, and through the slot of the upper shaft section to slidably and rotatively couple the upper shaft section and the upper intermediate shaft section, a frictional member bearing against the inner end of the tubular enlargement, a lower intermediate shaft section having a laterally extending head at its upper end bearing against the frictional member and with a socket at its lower end engaging over the slotted portion of the lower shaft section, a pin extending through the socket of the lower intermediate shaft section and the slot of the lower shaft section to slidably and rotatively couple the lower shaft section and the lower intermediate shaft section, and a spring supported within the tubular enlargement of the upper shaft section and bearing against the head portion of the upper intermediate shaft section.

In testimony whereof, we affix our signatures hereto.

JOHN F. WALTERS.
RICHARD S. WALTERS.